United States Patent [19]

Stoker

[11] 4,068,964
[45] Jan. 17, 1978

[54] END PLATE CONNECTION UNIT FOR BEAMS

[76] Inventor: Robert J. Stoker, 951 Thistle Place, Warren, Ohio 44480

[21] Appl. No.: 767,129

[22] Filed: Feb. 9, 1977

[51] Int. Cl.² .............................................. B25G 3/34
[52] U.S. Cl. ................................... 403/272; 403/189; 228/182
[58] Field of Search .............. 403/168, 189, 205, 231, 403/270, 271, 272, 393, 405; 228/182, 189, 173 F; 29/150; 113/116 HH

[56] References Cited

U.S. PATENT DOCUMENTS

| 2,008,087 | 7/1935 | Stromberg | 403/189 |
| 2,713,924 | 7/1955 | Tripp | 403/189 |
| 3,938,297 | 2/1976 | Sato | 403/189 |

FOREIGN PATENT DOCUMENTS

| 622,855 | 12/1935 | Germany | 403/272 |

Primary Examiner—Wayne L. Shedd
Attorney, Agent, or Firm—Ralph Hammar

[57] ABSTRACT

An improvement on the end plate shear connection (Table IX, Section 4-57, Seventh Edition A I S C Manual of Steel Construction) in which the end plate has an integral stem plate at right angles to the end plate and offset from the center line of the end plate to compensate for the web thickness of the beam to which the end plate is to be connected. The end plate is secured to the web of the beam by a shop weld with the weld adjacent the end plate fully penetrating the web, the stem plate and the end plate. Before welding, the stem plate is clamped to the web and minor adjustments made so that when welded the finished length of the beam will be proper and the end plate will be properly located and aligned with the center line of the beam. The end plate - stem plate unit is prefabricated in stock sizes. The unit may be a rolled shape. The stem plate may be joined to the end plate by a single fillet weld at the junction between the stem plate and the end plate remote from the web. The stem plate serves as a back-up bar while making a full penetration weld between the end plate and the web, from one side only of the beam.

6 Claims, 8 Drawing Figures

END PLATE CONNECTION UNIT FOR BEAMS

In structural steel construction, the end plate shear connection has been used to connect shapes to columns or other beams. The end plate shear connection requires that the web of the beam to be welded to the end plate be cut square in order to properly accept the end plate, that the holes in the end plate be vertical and parallel to the web and that the web be midway between the holes. In order to achieve the required squareness, very close control of the cut edge of the shape has been required. This may be accomplished with high quality, precision cutting circular saws (usually considered too expensive for job shop use) or else with slow cutting band saws. These expensive cuts provide a quality that approaches the milled end condition when carefully done. The saws normally used tend to wander upon striking hard and soft spots. Another disadvantage of the end plate construction is that it does not allow reasonable cutting tolerances.

These disadvantages are overcome by an end plate unit of modified T section. The head of the T is the end plate and the stem of the T is at right angles to the end plate and has its centerline displaced from the centerline of the plate a distance equal to half the thickness of the web. In assembly, the end plate is positioned on the web so that the end plate is at right angles to the centerline of the web and the stem plate is connected to the web by a full penetration weld between adjacent portions of the web, the stem and the end plate. If necessary, an additional lap weld may be made between the free edge of the stem plate and the web. This construction reduces the costs and improves the accuracy.

In the accompanying drawing

Figure 6:
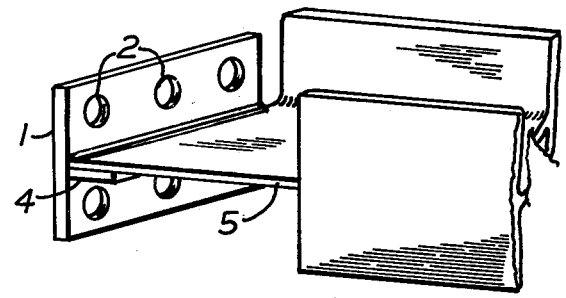
FIG. 6 is a view showing the FIG. 4 unit positioned on the web in readiness for welding.
Figure 8:
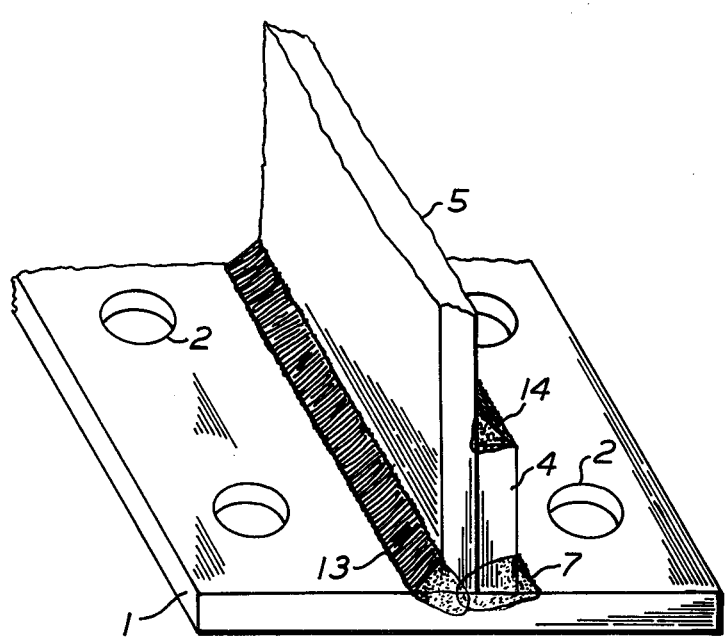
FIG. 8 is a perspective showing the welds between the end plate the stem plate and the web.

The end connection unit is of T section with the head 1 of the T of the same size as the end plate of the currently used end plate shear connection. There are two parallel rows of bolt holes 2 on opposite sides of the center line 3 of the end plate 1. The number of holes in each row may vary from one to six depending upon the depth of the web. The stem 4 of the T section projects from the face of the end plate adjacent the web. The stem is parallel to the rows of holes 2 and is offset to one side of the center line 3 a distance such that when the stem plate is clamped against the web 5 as shown in FIG. 6 the center line 3 of the end plate will line up with the center line of the web. This is accomplished when the face 6 of the stem plate 4 is spaced from the center line 3 a distance half the thickness of the web 5. The stem is square to the head or end plate so clamping of the stem to the web automatically squares the web to the end plate. A C-clamp or vice grip pliers is an adequate clamp. The end plate T section may be rolled or the section may be fabricated as shown in FIG. 8 where the stem plate 4 is connected to the end plate by a fillet weld 7 remote from the web 5. The end plate connection unit consisting of parts 1, 2, 4, 7 is a stock part made with the desired number of holes and to accommodate the various standard beams.

The beam is always used with the web vertical and the top holes 9 of the end plate are positioned the proper distance below the upper surface 10 of the beam. Clamping the stem to the web then automatically makes the end plate centered on and square to the web in all directions. This saves shop time and increases accuracy which reduces erection time and expense of correcting errors in the field. The holes in the structural shape to which the beam is to be attached such as a channel or a column or the end plate of another beam will be similarly punched so that when the beam is installed the holes in the end plate of the beam will line up with the holes in the other structural shape and the end plate may be bolted to the shape by high strength bolts. These bolts take the shear load.

Figure 7:
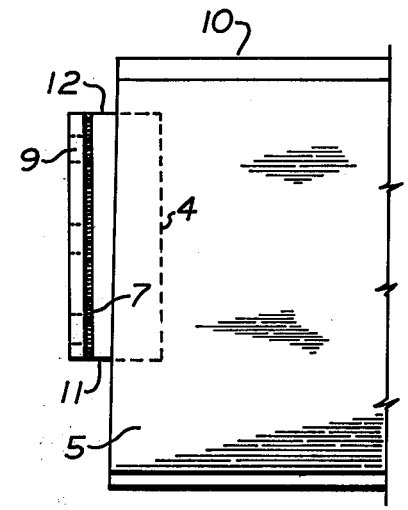
FIG. 7 is a diagrammatic view showing the end plate unit positioned to compensate for out of square cutting.

FIG. 7 shows the end plate fitted to a web 5 which has been cut slightly out of square. Note the distance 11 at the bottom of the end plate is less than distance 12 at the top of the end plate. FIG. 7 also illustrates how the end plate compensates for beams which are cut short. For example if the beam were cut square and short by the distance 12, the distance 11 at the bottom would be the same as the distance 12 at the top. Two fillet welds could be made where cutting variances make full penetration welds impractical.

Figure 1:
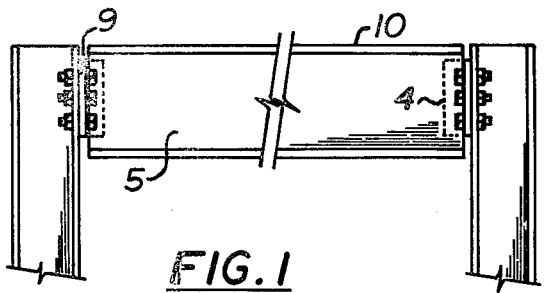
FIG. 1 is an elevation of a beam to column connection.
Figures 4, 5:
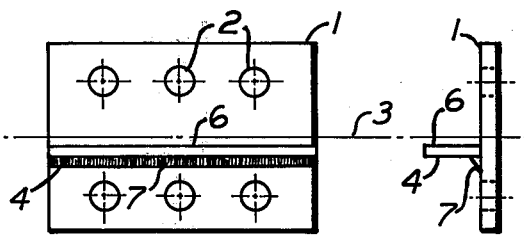
FIG. 4 is a plan view of the end plate connection plate unit.
FIG. 5 is an end view of FIG. 4.
Figure 2:
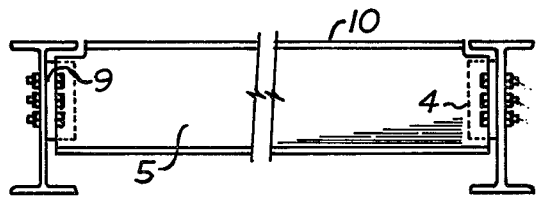
FIG. 2 is an elevation of a beam to beam connection.
Figure 3:
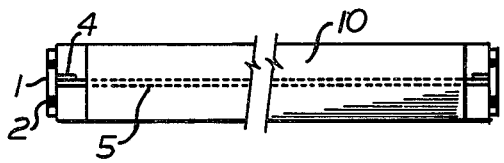
FIG. 3 is the top view of the beam to beam connection.

FIG. 6 shows an end plate connection unit mounted on the web 5 of a beam for making a connection such as shown in FIG. 2. The end plate is positioned for making the weld 13 between the web 5, the stem plate 4 and the end plate 1. If it is necessary to have an additional lap weld 14 between the stem plate 4 and the web 5, the beam would be turned over 180° so that the weld 14 would be horizontal and uppermost, and more easily made.

I claim:

1. An end plate shear connection for bolting a steel beam or the like to a structural shape, comprising a connection plate unit of T section with the head of the T perpendicular to the stem of the T, said unit adapted to be fixed to the web of a beam with the head in a vertical plane perpendicular to a vertical plane through the center line of the web, the head facing one end of the web and having bolt holes on opposite sides of the center line of the web for bolting the head to a structural shape, the stem of the T lying against the web and adapted to be secured to the web by a weld penetrating the head and the adjacent portions of the stem and said one end of the web for fastening the web to the head and stem.

2. The structure of claim 1 having a weld between the web and the end of the stem remote from the head.

3. The structure of claim 1 in which the center line of the head is in alignment with the center line of the web.

4. The structure of claim 1 in which the connection plate unit is a rolled section.

5. The structure of claim 1 in which the connection plate unit has a stem plate welded to the head by a weld remote from the web.

6. The structure of claim 1 in which the stem of the T is offset from the center line of the head a distance half the thickness of the web.

* * * * *